May 27, 1924.
J. L. HULBERT
MILKING MACHINE CLAW
Filed Sept. 20, 1921
1,495,745
2 Sheets-Sheet 1
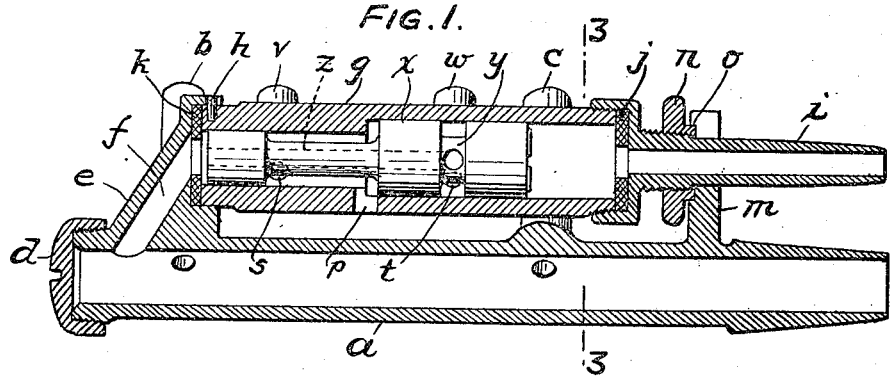
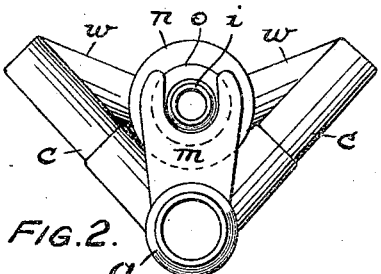 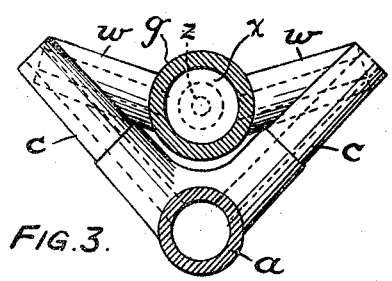
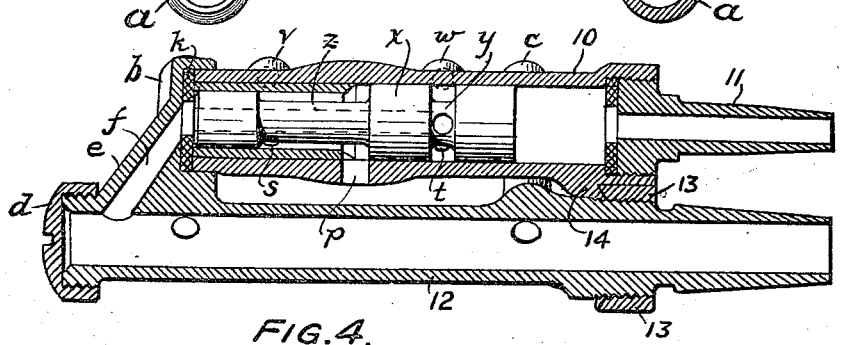
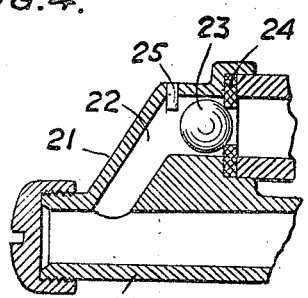
WITNESS.
INVENTOR
John L. Hulbert
BY
Frank S. Busser
ATTORNEY.

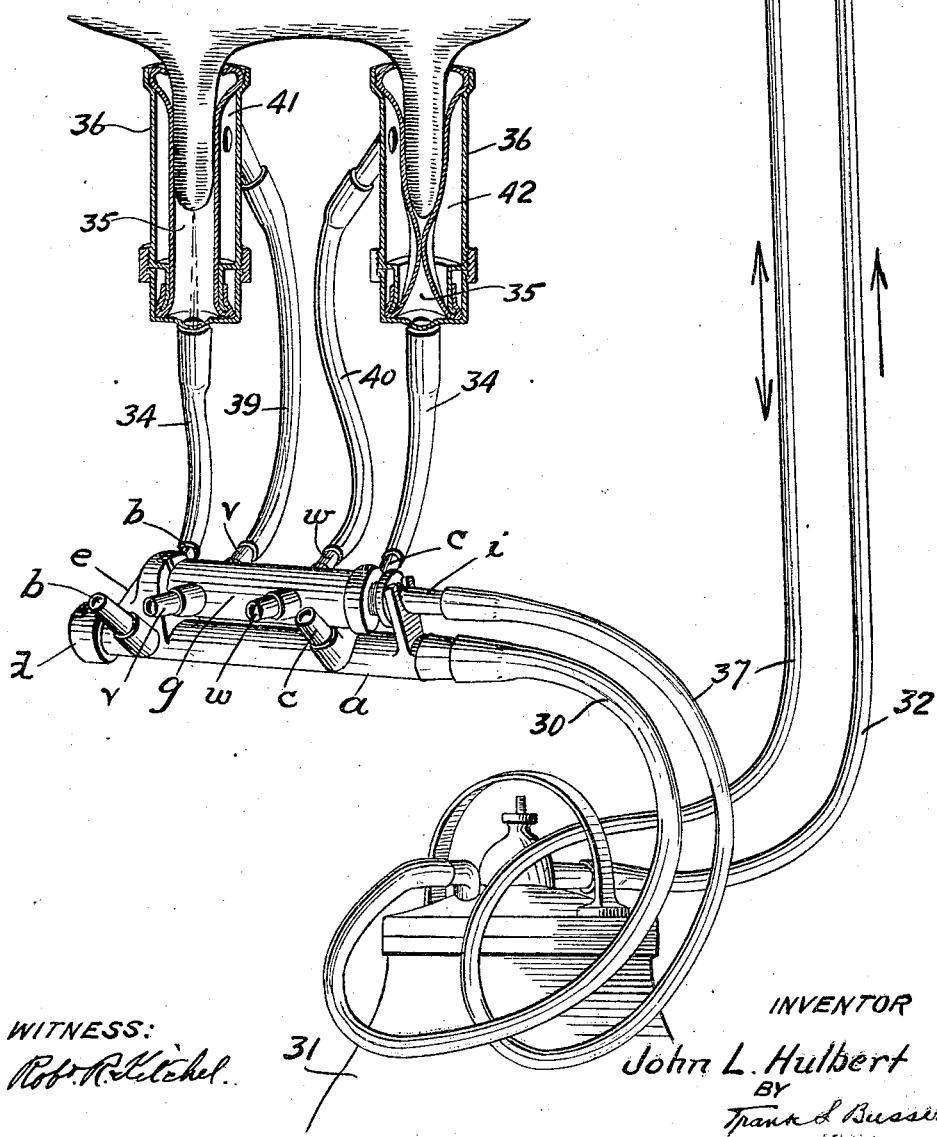

Patented May 27, 1924.

1,495,745

UNITED STATES PATENT OFFICE.

JOHN L. HULBERT, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING-MACHINE CLAW.

Application filed September 20, 1921. Serial No. 502,017.

*To all whom it may concern:*

Be it known that I, JOHN L. HULBERT, a citizen of the United States, residing at Poughkeepsie, county of Dutchess, and State of New York, have invented a new and useful Improvement in Milking-Machine Claws, of which the following is a full, clear, and exact description, reference being had to the accompanying drawings, which form a part of this specification.

My invention relates to clusters or claws of milking machines and particularly to those adapted for use with teat cups each of which has two chambers; an inner chamber to receive the teat and which is connected with the milk pail and a source of suction; and an outer or inflation chamber which receives pneumatic pulsations, preferably by alternately connecting the same with atmosphere and with a partial vacuum.

The clusters or claws to which my invention more particularly relates are those comprising a milk chamber connected with the inner teat cup chambers and the milk pail, a pulsation chamber, and a valve operable from a master or primary pulsator and adapted to connect two of the outer teat cup chambers with suction while connecting the other two with pressure and alternately therewith reverse said connections. An example of such a cluster or claw is contained in the Leitch Patent No. 1,255,186, February 5, 1918. The present invention involves the use and adaption of certain features of this patent, but it also embodies other features of importance and utility, such, for example, as those which allow the air from the pulsation chambers of the teat cup to exhaust directly into the milk chamber of the claw, as in the Forsyth Patent No. 1,257,688, February 26, 1918.

For sanitary reasons it is necessary that the parts of the machine with which the milk comes in contact, such as the milk chamber of the claw, shall be frequently and thoroughly washed. On the other hand, moving parts that require to be lubricated, such as the pulsation member of the claw, should preferably be kept out of the wash water. The objects of the present invention are: to provide a claw in which the pulsation member and milk member are securely fastened together when in use but may be easily separated at the time for washing; to provide in the claw straight and easily cleaned passages; to avoid substantial strain on the flexible pipes connecting the claw with the teat cups; and to adapt the claw to that type of milking machine wherein the air from the pulsation chambers of the teat cups exhausts into the milk chamber of the claw.

In the drawings, which show preferred embodiments of the invention:

Fig. 1 is a longitudinal sectional view of one embodiment of the invention.

Fig. 2 is an end view.

Fig. 3 is a cross-section on line 3—3 of Fig. 1.

Fig. 4 is a longitudinal sectional view of another embodiment.

Fig. 5 is a sectional view of a modified detail.

Fig. 6 is a general view showing the milking machine claw connected wth the teat cups, the milk pail and the sources of vacuum and pulsation.

The cylindrical milk member $a$ of the cluster has one open end adapted for connection with a flexible tube 30 leading to the milk pail 31. (See Figs. 1 and 6.) Suction is maintained in the milk pail by any means known in the art, as by a tube 32 connected with a vacuum pipe line 33 in turn connected with a vacuum pump (not shown). Two pairs of radial branch tubes or stumps $b$ and $c$ are adapted for connection, through flexible tubes 34, with the milk chambers 35 of two pairs of teat cups 36.

The end of the milk member $a$ opposite to its open end is threaded and shouldered to receive a cap or closure $d$. Adjacent to the closed end of the milk chamber is an upstanding projection $e$ shaped to form a seat or socket for one end of a detachable cylindrical valve member $g$. Extending through this projection, preferably at an oblique angle to the axes of the milk chamber and valve chamber, is a channel $f$, one end of the channel opening into the interior of the milk chamber and the other end of the channel opening into the valve chamber.

The cylindrical valve chamber $g$ is open at both ends. One end seats in the projection $e$ of the milk chamber, as above described. The same end of the valve chamber carries a projection $h$ adapted to extend into a recess in the upper wall of the seat for such end of the valve chamber, whereby the two members of the claw are prevented from turning relatively to one another.

Threaded on the other end of the valve chamber is a tube or nozzle *i* the neck of which is adapted for connection with a flexible tube 37, which is in turn connectible with the primary pulsation pipe line 38 of the system.

A washer *k* is confined between the projection *e* and one end of the valve chamber. A washer *j* is confined between the other end of the valve chamber and the head of the nozzle *i*.

The neck of the tube or nozzle *i* extends through a forked member *m* upstanding from the milk member *a*. Threaded on the neck of the nozzle *i* is a nut *n* having a hub *o* adapted to be screwed outward against the forked member *m* and, when in that position, to enter a seat countersunk in the forked member *m*, thereby holding the nozzle end of the valve member from being lifted.

The valve chamber has an atmosphere port *p* and two pairs of ports *s* and *t* communicating respectively with radial tubes or stumps *v* and *w* adapted for connection respectively through tubes 39 and 40 with the outer or pulsation chambers 41 and 42 of the respective pairs of teat cups.

The valve *x* has a head slidable in the portion of the valve chamber of larger diameter, a head slidable in the portion of the valve chamber of smaller diameter and a connecting neck. The head of larger diameter has a groove adapted to register in one position of the valve with ports *t*. An axial passage *z* extends through the valve from the groove *y* to the end of the small head of the valve.

In operation, the pneumatic pulsator valve *x*, when in one position (say in the position shown in Fig. 1) admits atmospheric air, through port *p* and ports *s* and nozzles *v*, in to the outer chambers 41 of one pair of teat cups, while air exhausts from the outer chambers 42 of the other pair of teat cups through nozzles *w*, ports *t*, groove *y*, passage *z*, and channel *f* into the milk chamber *a*. When the valve *x* is in the opposite position, atmospheric air is admitted, as shown in Fig. 6 through port *p* and ports *t* and nozzles *w*, into the outer chambers 42 of the second pair of teat cups, while air exhausts from the outer chambers 41 of the first pair of teat cups through nozzles *v*, ports *s* and channel *f* into the milk chamber *a*.

To disassemble the two members of the claw, the nut *n* is screwed toward the left (Fig. 1), thereby moving the hub of the nut from its seat in the forked member *m*. This allows the nozzle end of the valve member *g* to be lifted above the seat of the fork and permits the valve member to be drawn to the right away from its seat against the projection *e* on the milk member *a*. Thereby the channel *f* may be cleaned. By unscrewing the tube or nozzle *i*, the valve *x* may be removed from the valve chamber *g* and the latter may be readily cleaned, if desired. The milk chamber may be readily cleaned by removing the end cap or closure *d*.

In the modification shown in Fig. 4, the parts *b*, *c*, *d*, *e*, *f*, *k*, *p*, *s*, *t*, *v*, *w*, *x*, *y* and *z* are the same as in the construction of Figs. 1, 2 and 3. The valve member 10 is of slightly enlarged internal diameter at the right hand end and its enlarged part is internally screw-threaded to receive the nozzle or tube 11 adapted for connection with the pulsation tube 37. The corresponding end of the milk member 12 is externally screw-threaded to receive a nut 13 with an undercut end. A mating side lug 14 on the valve member 10 is adapted to fit around the bottom of the milk member and receive pressure from the nut 13. The parts may be readily detached by merely unscrewing the nut 13.

It is desirable, but not necessary, to provide a check valve between valve chamber *g* and milk chamber *a* of the claw to prevent the possibility of back flow of the milk from the milk chamber. The valve may be conveniently positioned in the channel (corresponding to *f* in Fig. 1) of the projection (corresponding to *e* in Fig. 1) on the milk member. In Fig. 5, 20 is the milk member, 21 the projection, 22 the channel formed therein, 23 a ball valve in the channel adapted to coact with the orifice in washer 24, and 25 a stop limiting the movement of the valve off its seat.

In all the embodiments of my invention hereinbefore described it will be noted that the radial stumps *b*, *b* and *c*, *c* are arranged in two planes high above the horizontal and that the radial stumps *v*, *v* and *w*, *w* are arranged in two planes at a lesser angle to the horizontal and that the lengths of the stumps and the angles of the planes are such that the ends of the stumps approximately coincide with the lines of intersection of the planes. By this arrangement, provision is made for equality of length between the milk tubes and the pulsation tubes (measured from the bottoms of the teat cups). Thereby, in applying the milking machine to the claw, there is but a slight difference in bending between the two sets of tubes and the weight of the cups is divided between them. At the same time there are no crooked passages (such as would obstruct cleaning) in either set of stumps.

While my invention is more particularly applicable to the type of claw or cluster set forth in the part of this specification immediately following the preamble, the construction herein disclosed is readily adaptable to differently acting pulsators and teat cups without departing from my invention.

Except in those claims wherein the capacity for separation or detachment of the two members of the claw is specified, it is not intended to limit the invention thereto, inasmuch as the relative arrangement of the stumps of the two members, the arrangement of ports including communication between one end of the pulsation cylinder and the passage in the milk member, and the provision of a check valve between the pulsation cylinder and milk passage, possess advantages that are not dependent upon the separable character of the two members of the claw.

Having now fully described my invention, what I claim and desire to protect by Letters Patent is:

1. A milking machine cluster comprising a milk member having a milk passage, tubes supported thereon adapted for connection with the teat chambers of double chamber teat cups and communicating with the milk passage, a separable pulsation member having a valve chamber, tubes supported thereon adapted for connection with the inflation chambers of double chamber teat cups and communicating with the valve chamber, a valve in the valve chamber, there being an opening in the valve chamber adapted to be connected with a source of pneumatic pulsations whereby the reciprocation of the valve is controlled, and means affording communication between the valve chamber and the milk passage, there being ports and passages adapted, in the reciprocation of the valve, to connect the tubes of the pulsation chamber alternately with atmosphere and with said communication means.

2. A milking machine cluster comprising a member affording a milk passage, a separable pulsation member affording a valve chamber, a valve in the valve chamber, there being an opening in the valve chamber adapted to be connected with a source of pneumatic pulsations whereby the reciprocation of the valve is controlled, tubes supported on the valve chamber adapted for connection with the inflation chambers of double chamber teat cups, and a channeled projection on one end of the milk member affording an end seat for the valve member and a means for exhausting air from the valve chamber into the milk passage, there being ports and passages adapted, in the reciprocation of the valve, to connect the tubes of the pulsation chamber alternately with atmosphere and with the end seat of the valve.

3. A milking machine cluster comprising a member affording a milk passage, a separable pulsation member affording a valve chamber, a projection on the milk member affording a seat for one end of the pulsation member, and means to hold the other end of the pulsation member from detachment from the milk member, said means comprising an adjustable element adapted to be operated to release the latter end of the pulsation member to allow the pulsation member to be withdrawn from its seat.

4. A milking machine cluster comprising a member affording a milk passage, a separable pulsation member affording a valve chamber, a channeled projection on one end of the milk member affording an end seat for the valve member and a means of communication between the valve chamber and the milk passage, and means to hold the other end of the pulsation member from detachment from the milk member, said means comprising an adjustable element adapted to be operated to release the latter end of the pulsation member to allow it to be withdrawn from its seat.

5. A milking machine cluster comprising a member affording a milk passage, a separable pulsation member affording a valve chamber, a channeled projection on one end of the milk member affording an end seat for the valve member and a means of communication between the valve chamber and the milk passage, means to hold the other end of the pulsation member from detachment from the milk member, said means being operable to release the pulsation member and allow it to be withdrawn from its seat, and coacting means on the two members adapted, when the pulsation member is locked to the milk member, to prevent the pulsation member from turning on its axis relative to the milk member.

6. A milking machine cluster comprising a member affording a milk passage, a separable pulsation member affording a valve chamber, means affording communication between the two members and a socket to receive one end of the pulsation member, and adjustable means on one member and stationary means on the other member adapted to coact to force said end of the pulsation member into said socket.

7. A milking machine cluster comprising a milk member, a pulsation member, one of said members being provided with a socket at one end portion and open toward the other end, an end of the other member adapted to enter the socket, a projection on one member, and a nut threaded on the other member adapted to engage such projection and force said end of the last named member into the socket.

8. In a milking machine claw, in combination, a member having a milk passage and four approximately radial stumps in two planes, and a member having a pulsation passage parallel with the milk passage and four approximately radial pulsation stumps in two planes, the four passages from the milk passage to the ends of the first mentioned stumps and from the pulsation passage to the ends of the second mentioned stumps being straight, the length of the stumps and the angles of the planes being such that the ends of the stumps approximately coincide with the lines of intersection of the planes.

9. In a milking machine claw, in combination, a member having a milk passage with four approximately radial stumps in two planes, a member having a pulsation passage parallel with the milk passage, and four approximately radial pulsation stumps in two planes, the four passages from the milk passage to the ends of the first mentioned stumps and from the pulsation passage to the ends of the second mentioned stumps being straight, the lengths of the stumps and the angles of the planes being such that the ends of the stumps approximately coincide with the lines of intersection of the planes, and means at one end of the claw affording communication between said passages.

10. In a milking machine claw, in combination, a member having a milk passage and four approximately radial stumps in two places at angles high above the horizontal and a member having a pulsation passage parallel with the milk passage and four radial stumps in two planes at a lesser angle above the horizontal, the four passages from the milk passage to the ends of the first mentioned stumps and from the pulsation passage to the ends of the second mentioned stumps being straight, the lengths of the stumps and the angles of the planes being such that the ends of the stumps approximately coincide with the lines of intersection of the planes.

11. In a milking machine claw, in combination, a member having a milk passage and four approximately radial stumps in different planes, a pulsation cylinder parallel with the milk passage having four approximately radial stumps in different planes, one end of said cylinder being in communication with the milk passage, the other end adapted to communicate with a source of pneumatic pulsations, and the centre in communication with the atmosphere, and a piston in said cylinder reciprocable under the influence of said pneumatic pulsations and adapted in its reciprocations to connect each pulsation stump alternately with the atmosphere and the milk passage.

12. A milking machine cluster comprising a milk member having a milk passage, tubes supported thereon adapted for connection with the teat chambers of double chamber teat cups and communicating with the milk passage, a pulsation member having a valve chamber, tubes supported thereon adapted for connection with the inflation chambers of double chamber teat cups and communicating with the valve chamber, a valve in the valve chamber, means affording communication between the valve chamber and the milk passage, there being ports and passages adapted, in the reciprocation of the valve, to connect the tubes of the pulsation chamber alternately with atmosphere and with said communication means, and a check valve between the milk passage of the milk member and the valve chamber of the pulsation member allowing flow of air toward the milk passage but preventing flow of milk from the passage into the valve chamber.

In testimony of which invention, I have hereunto set my hand, at Poughkeepsie, on this 7th day of September, 1921.

JOHN L. HULBERT.